United States Patent [19]
Evans et al.

[11] Patent Number: 5,716,028
[45] Date of Patent: Feb. 10, 1998

[54] AIRCRAFT CARGO HANDLING

[75] Inventors: Richard L. Evans; Dave Swartz; Gerald G. Swiatlowski, all of Grand Rapids, Mich.

[73] Assignee: Vickers, Inc., Maumee, Ohio

[21] Appl. No.: 546,540

[22] Filed: Oct. 20, 1995

[51] Int. Cl.$^6$ ............................................. B64D 9/00
[52] U.S. Cl. .................... 244/137.1; 414/503; 414/533
[58] Field of Search ................ 244/137.1, 137.3; 414/523, 533, 534, 503; 198/782, 611, 300, 570

[56] References Cited

U.S. PATENT DOCUMENTS

| | | | |
|---|---|---|---|
| 3,447,665 | 6/1969 | Egeland et al. | 414/533 |
| 3,712,495 | 1/1973 | Carder et al. | 414/503 |
| 3,735,885 | 5/1973 | Comfort | 414/503 |
| 4,006,816 | 2/1977 | Werntz. | |
| 4,225,926 | 9/1980 | Wendt | 244/137.1 |
| 4,286,441 | 9/1981 | Scheneman, Jr. et al. | |
| 4,488,638 | 12/1984 | Morgan et al. | |
| 4,534,462 | 8/1985 | Hoover et al. | |
| 4,780,043 | 10/1988 | Fenner et al. | 244/137.1 |
| 4,887,490 | 12/1989 | Russ | 244/137.1 |
| 5,020,657 | 6/1991 | Huber. | |
| 5,170,966 | 12/1992 | Sheu. | |
| 5,183,150 | 2/1993 | Chary et al. | 244/137.1 |
| 5,186,417 | 2/1993 | Pritchard. | |
| 5,213,201 | 5/1993 | Huber et al. | |

FOREIGN PATENT DOCUMENTS 4136972  5/1993  Germany ............... 244/137.1

*Primary Examiner*—Galen L. Barefoot
*Attorney, Agent, or Firm*—Barnes, Kisselle, Raisch, Choate, Whittemore & Hulbert

[57] ABSTRACT

A system and method for loading cargo as cargo units in an aircraft cargo handling system having a cargo loading bay that opens laterally of the aircraft and at least one cargo stowing bay adjacent to the cargo loading bay longitudinally of the aircraft. Two self-erecting power drive units are disposed in the cargo loading bay such that the associated rollers are oriented to propel cargo units in orthogonal directions. The two power drive units in the loading bay are also disposed adjacent to each other such that, when both are in the erected position, the rollers of each unit simultaneously engage a single overlying cargo unit. The power drive units may be simultaneously placed in the erected position with the motors de-energized, such that orthogonal orientation of the de-energized drive rollers effectively prevents movement of an overlying cargo unit engaged by both rollers, whereby the cargo unit so engaged is prevented from inadvertent movement out of the loading bay. The power drive units are equipped with a sensor for detecting when a cargo unit overlies the power drive unit, and a controller is responsive to such sensors for removing power from the power drive units when not in use.

17 Claims, 4 Drawing Sheets

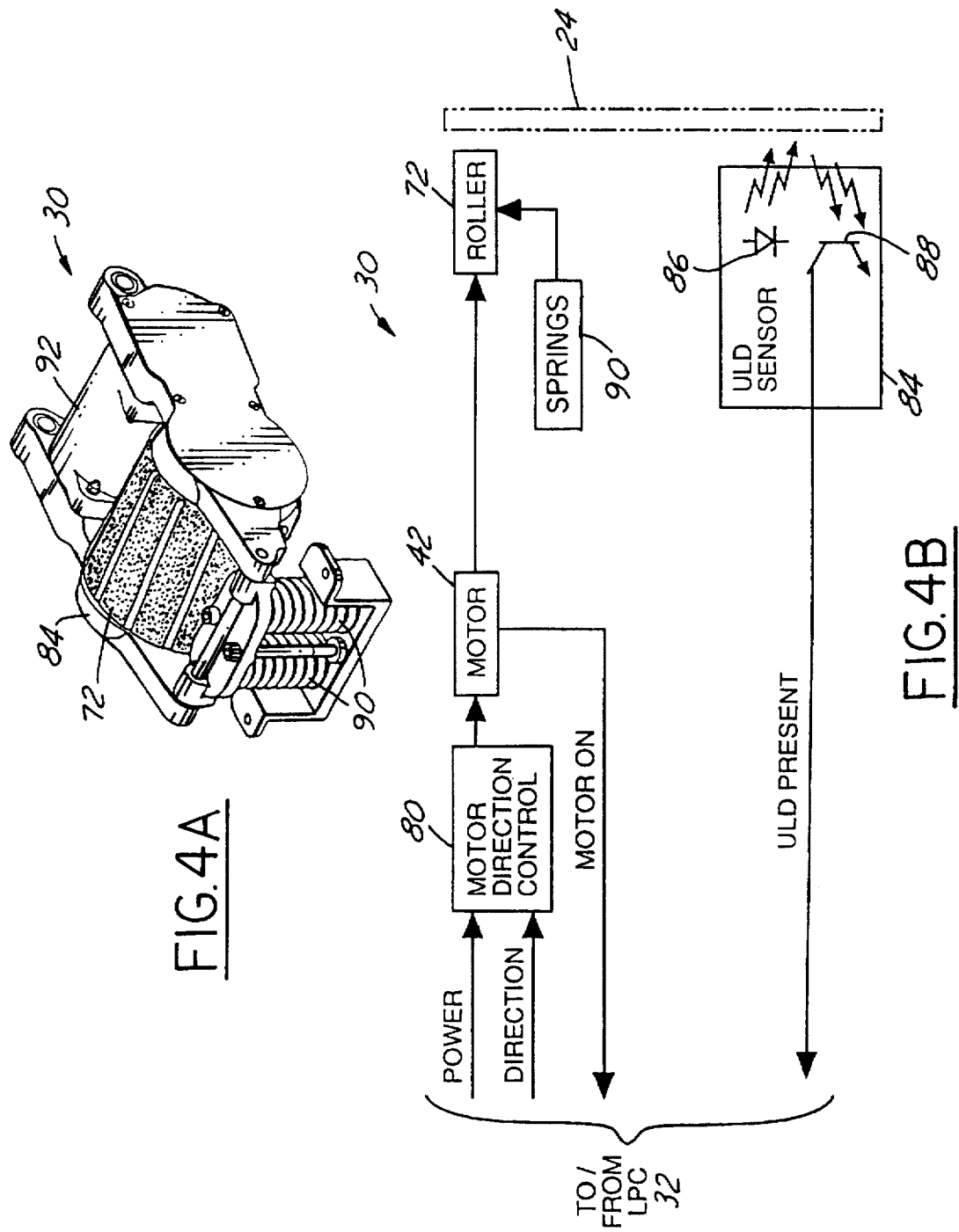

AIRCRAFT CARGO HANDLING

The present invention is directed to aircraft cargo handling systems and methods, and more particularly to control of power drive units for propelling cargo containers between and among cargo loading and stowing bays in an aircraft.

BACKGROUND AND SUMMARY OF THE INVENTION

It is a general object of the present invention to provide an improved system and method for construction and control of power drive units for loading cargo containers into and out of the loading bay of an aircraft, and for conveying the cargo units from and to the loading bay through the aircraft stowing bays. Another object of the present invention is to provide an aircraft cargo handling system and method of the described character in which each power drive unit is equipped with facility for sensing when a cargo unit overlies the power drive unit so as to conserve application of power to the power drive units when not needed for use.

One aspect of the present invention contemplates a system and method for loading cargo as cargo containers in an aircraft cargo handling system having a cargo loading bay that opens laterally of the aircraft and at least one cargo stowing bay adjacent to the cargo loading bay longitudinally of the aircraft. A plurality of (at least two) power drive units are disposed in the cargo loading bay. Each of the power drive units includes a power drive roller for engagement with a cargo container that overlies the power drive unit, a motor responsive to application of electrical power for driving the roller, and structure for selectively erecting or lifting the power drive unit from a retracted position in which the roller would be spaced beneath an overlying cargo unit to an erected or lifted position in which the drive roller is disposed for engagement with an overlying cargo unit. The two power drive units are disposed such that the associated rollers are oriented to propel cargo units in orthogonal directions—i.e., either laterally into or out of the loading bay, or longitudinally in the forward/aft direction between the loading bay and an adjacent stowing bay. The two power drive units in the loading bay are also disposed adjacent to each other such that, when both are in the erected position, the rollers of each unit simultaneously engage a single overlying cargo unit. The power drive units are coupled to a controller for selectively energizing the motors and the structure for erecting the power drive units. The power drive units may be simultaneously placed in the erected position with the motors de-energized, such that orthogonal orientation of the de-energized drive rollers effectively prevents movement of an overlying cargo unit engaged by both rollers, whereby the cargo unit so engaged is prevented from inadvertent movement out of the loading bay.

The power drive units in the cargo loading bay in the preferred embodiments of the invention comprise so-called self-erecting units responsive to application of electrical power to the drive motor for both erecting the unit and driving the drive roller. The motor is coupled through a power-splitting planetary gear differential to a mechanism for erecting the power drive unit upon initial application of electrical power to the motor, and for thereafter applying motor output torque to the drive roller. Each self-erecting power drive unit includes a brake mechanism coupled to the unit-erecting mechanism and responsive to the controller for maintaining the power drive unit in the erect position independently of the motor and upon removal of electrical power from the motor. The controller is responsive to a system operator for activating the lateral power drive unit in a first mode of operation for loading or unloading cargo to or from the cargo loading bay by erecting the lateral power drive unit and energizing the associated roller to propel cargo engaged by such roller laterally into or out of the loading bay. In a second mode of operation selectable by the system operator, the longitudinally directed power drive unit is erected and energized to propel cargo in the longitudinal direction between the cargo loading bay and the adjacent cargo stowing bay. In a third mode of operation, both of the power drive units are placed in the erected position so as to lock a cargo unit engaged by both of the drive rollers. The third mode of operation in the preferred embodiments of the invention is automatically entered by operation of the controller when neither the first nor the second mode of operation has been selected by a system operator.

Power drive units are also disposed in the cargo stowing bays in the preferred embodiments of the invention for conveying cargo units from the cargo loading bay longitudinally to and through the cargo stowing bays. The power drive units in the cargo stowing bays are also connected to the system controller and responsive to control of a system operator. The drive motors in all of the power drive units are bidirectional motors, with the system controller controlling direction of rotation under control of the system operator. To enhance system control while conserving electrical power, each power drive unit may be equipped with a sensor in accordance with another aspect of the present invention for sensing when a cargo unit overlies the associated drive unit. (This aspect of the present invention may be employed either separately from or in combination with other aspects of the invention.) The several sensors are all connected to the system controller for selectively activating and de-activating the power drive units as cargo units are conveyed through the cargo bays. The sensor in the preferred embodiments of the invention comprises an electro-optical sensor responsive to reflection of light from an overlying cargo unit. The sensor may take other forms, such as a mechanical contact switch.

BRIEF DESCRIPTION OF THE DRAWINGS

The invention, together with additional objects, features and advantages thereof, will be best understood from the following description, the appended claims and the accompanying drawings in which:

FIG. 4A is a perspective view of a spring-loaded power drive unit (SLPDU) employed in the system of FIG. 1, and FIG. 4B is a functional block diagram of the SLPDU illustrated in FIG. 4A.

DETAILED DESCRIPTION OF PREFERRED EMBODIMENTS

Figure 1:
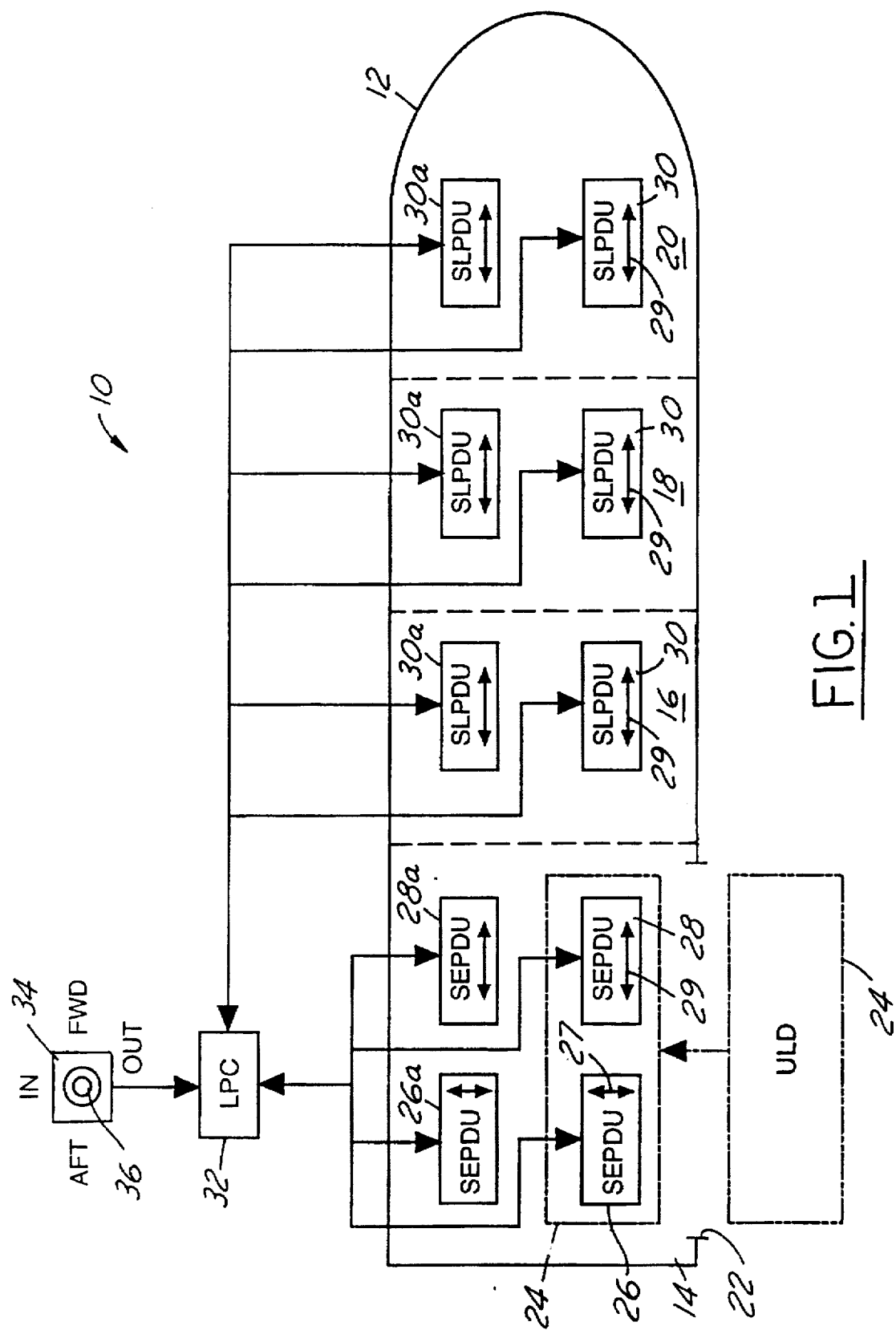
FIG. 1 is a functional block diagram of an aircraft cargo handling system in accordance with an exemplary embodiment of the invention.

FIG. 1 illustrates a cargo handling system 10 in accordance with an exemplary preferred embodiment of the invention employed in conjunction with an aircraft 12 having a cargo loading bay 14 and a series of cargo stowing bays 16,18,20. Cargo loading bay 14 opens laterally of aircraft 12 through a cargo bay door 22 dimensioned to receive a cargo unit 24 of standardized dimension on a tray or in a standard container, etc. Such cargo units 24 are often called unit loading devices or ULDs in the art. Cargo unit stowing bays 16,18,20 are positioned longitudinally adjacent to each other and to loading bay 14 so that cargo units may be conveyed through the bays in sequence. It will be appreciated, of course, that additional stowing bays may be provided aft of loading bay 14. Aircraft 12 is illustrated in FIG. 1 as being dimensioned to accommodate two cargo units 12 in lateral side-by-side position. Greater or fewer lateral cargo unit positions may be provided. The illustration of loading and stowing bays in FIG. 1 is for purposes of discussion only. Directional adjectives, such as "lateral" and "longitudinal," are employed by way of description with reference to this exemplary configuration.

A pair of self-erecting power drive units (SEPDUs) 26,28 are disposed in fixed position in loading bay 14 sufficiently closely adjacent to each other so that both units 26,28 may engage a single overlying cargo unit 24. Each power drive unit is bidirectional in construction, which is to say that power drive unit 26 is configured and disposed to propel cargo units 24 in the lateral direction 27 into and out of bay door 22, while power drive unit 28 is configured and disposed to propel cargo units 24 in the forward/aft direction 29 to and from the adjacent cargo stowing bay 16. A spring-loaded power drive unit (SLPDU) 30 is disposed within each stowing bay 16,18,20 in general longitudinal alignment with drive unit 28 for conveying cargo units 24 in sequence from loading bay 14 to and through loading bays 16,18,20. Each spring-loaded power drive unit 30 is constructed and positioned to propel cargo units bidirectionally in the forward/aft direction 29. A second series of self-erecting power drive units 26a, 28a and spring-loaded power drive units 30a is positioned laterally adjacent to drive units 26,28,30.

All of the power drive units 26,28,30,26a,28a,30a are connected to a logic power and control panel (LPC) or controller 32. Controller 32 controls operation of the various power drive units and receives feedback information therefrom, as will be described in detail hereinafter. Controller 32 also receives operator control information from a joystick 34 having a handle 36 that may be manipulated by an operator to four orthogonally disposed positions for commanding movement in the lateral IN and OUT directions, or in the forward (FWD) or AFT directions. In the centered position of handle 36, no cargo unit motion is commanded. LPC/controller 32 preferably comprises a microprocessor-based controller of any suitable architecture.

As will be understood by persons skilled in the art, power drive units 26,28,26a and 28a are surrounded by an omnidirectional conveyor such as a ball transfer unit for supporting the weight of cargo units 24 during motion either laterally into or out of the loading bay or longitudinally to or from the stowing bays. Likewise, unidirectional roller conveyors or the like are disposed in stowing bays 16,18,20 surrounding drive units 30,30a and supporting the weight of the cargo units. The ball or roller conveyors support the cargo units in a plane along which the units are propelled by the power drive units. These conventional conveyor mechanisms are not illustrated in FIG. 1 for purposes of clarity.

Figure 2A:
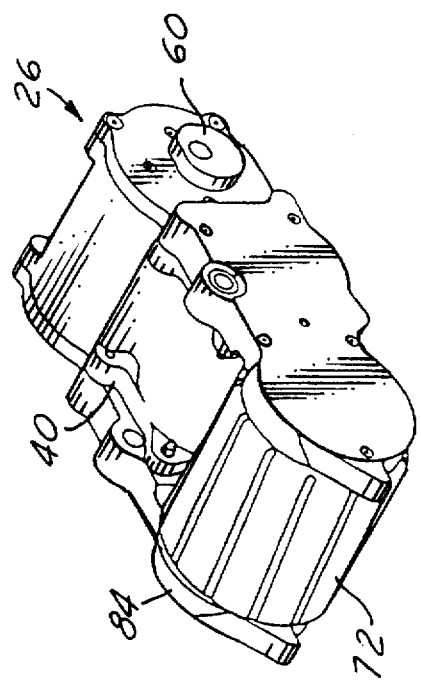
FIG. 2A is a perspective view of a self-erecting power drive unit (SEPDU) employed in the system of FIG. 1.
Figure 2B:
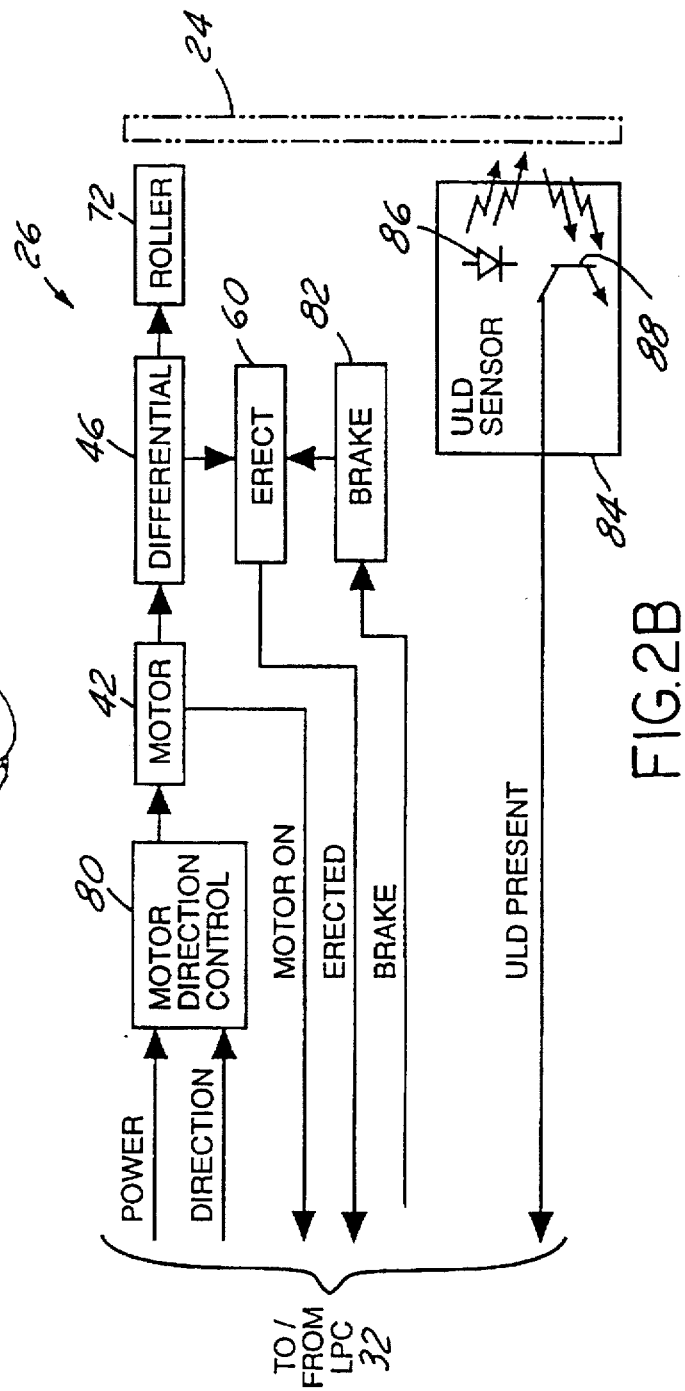
FIG. 2B is a functional block diagram of the SEPDU of FIGS. 2A.
Figure 3:
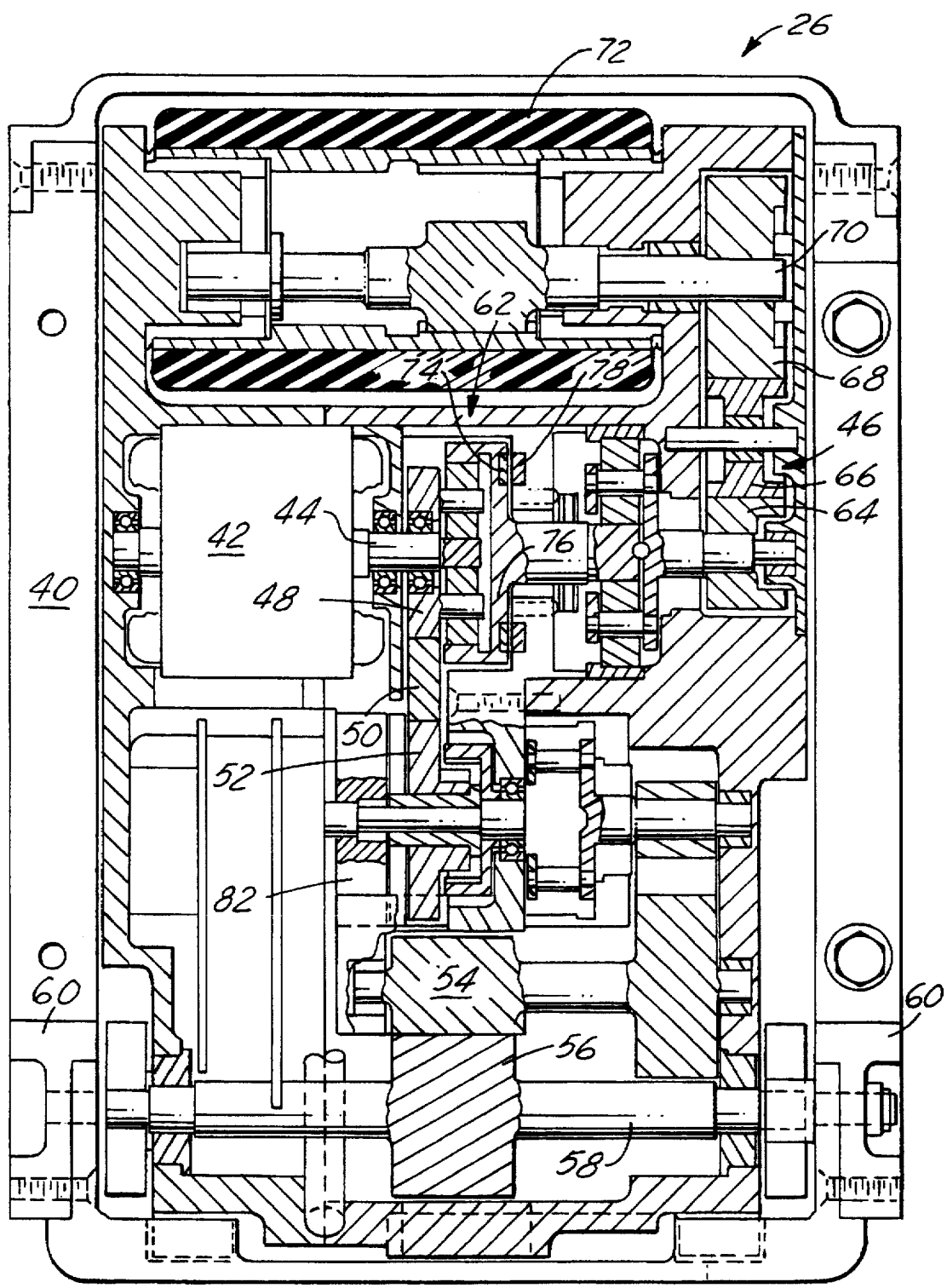
FIG. 3 is a sectional view of the self-erecting power drive unit illustrated in FIGS. 2A and 2B.

FIGS. 2A,2B and 3 illustrate self-erecting power drive unit 26, units 28,26a and 28a being identical thereto. A case 40 houses a bidirectional a/c induction motor 42. A power-splitting planetary gear differential 46 has an input connected to the output shaft 44 of motor 42, and a first output connected through a series of gears 48,50,52,54,56 to a lift shaft 58 coupled to lift cams 60. A second output of differential 46 is connected through a torque control mechanism 62 and a series of gears 76,64,66 and 68 to a roller drive shaft 70. A drive roller 72 is coupled to shaft 70, and is responsive to application of electrical power to motor 42 for engaging and propelling cargo units, as will be described. Torque control device 62 comprises a circumferential array of magnets 74 mounted on a gear 76 coupled to gear 76, and a second circumferential array of permanent magnets 78 disposed in fixed position axially opposed to the array of magnets 74.

Upon initial application of electrical power to motor 42, the magnetic forces in torque control 62 resist application of torque through gears 76,64,66,68,70 to roller 72, so that the initial motor output torque is transferred by gears 48,50,52, 54,56 to shaft 58 and lift cams 60. Cams 60 operate against adjacent followers on the support structure so that unit 26 is lifted or erected from a retracted position, in which roller 72 is disposed at a position beneath the plane of the surrounding conveyor and thus beneath an overlying cargo unit, to a lifted or erected position in which roller 72 is disposed to engage an overlying cargo unit. At this lifted or erected position, further rotation of shaft 58 and cams 60 is prevented, so that the output torque of motor 42 overcomes the magnetic drag applied by torque control 62 and drives roller 72 to rotate about its axis. Cams 60 are symetrical so as to lift the power drive unit whether the motor is energized in the forward or reverse direction.

Direction of rotation of motor 42 is controlled by a motor direction control circuit 80 (FIG. 2B, such as a phase reversing relay), which receives electrical power and directional control signals from LPC/controller 32 (FIG. 1). An electromagnetic brake 82 (FIGS. 2B and 3) is disposed adjacent to differential gear 52 (FIG. 3), and is responsive to a brake control signal from LPC/controller 32 to hold gear 52 of differential 46, and thereby hold power drive unit 26 in erected position, independent of motor 42. Power drive unit 26 also includes a photo-optical sensor 84 that has a laser diode light source 86 and a phototransistor light detector 88 disposed to detect presence of an overlying cargo unit 24 as a function of light energy transmitted to and reflected back from the overlying cargo unit. (An ambient light sensor may be employed, which detects an overlying cargo unit when ambient light is blocked.) Sensor 84 provides a corresponding electrical signal to LPC/controller 32 indicating whether or not a cargo unit or ULD is in position overlying the power drive unit.

FIGS. 4A and 4B illustrate spring-loaded power drive unit (SLPDU) 30, unit 30a being identical thereto. A bidirectional electric motor 42 is disposed within a case 92 and coupled by suitable gearing to a cargo unit drive roller 72. Motor 42 is controlled by a phase reversing relay or other suitable motor direction control circuit 80, which in turn receives power and direction control information from LPC/controller 32 (FIG. 1). A feedback signal is provided to LPC/controller 32 indicating operation of motor 42. A cargo unit or ULD sensor 84 is provided in SLPDU 30 for indicating presence of a cargo unit or ULD 24 overlying power unit 30, and providing a corresponding signal to LPC/controller 32 as previously described. It will be noted in FIG. 4B that SLPDU 30 contains no mechanism for selectively lifting and lowering the drive roller, or a brake as in FIGS. 2B and 3 for maintaining the roller in the erect position. Rather, case 92 of drive unit 30 is engaged by a pair of coil springs 90 for urging roller 72 to a position for driving engagement with an overlying cargo unit 24.

In operation, loading of a cargo unit or ULD is initiated by operator movement of joystick handle 36 to the IN position. LPC/controller 32 then monitors sensors 84 in drive unit 26 to determine whether or not a cargo unit 24 is present at the loading bay door. If a cargo unit is or has been loaded through the loading door, the cargo unit will be detected by sensor 84 of drive unit 26. LPC/controller 32 is responsive to the signal from the ULD sensor for activating the drive motor of SEPDU 26 to erect the drive unit and then drive the drive roller so as to assist the loading operation. That is, LPC/controller 32 supplies power and direction control information to SEPDU 27 to drive the overlying cargo unit in the IN direction. The cargo unit may then be stopped in position overlying drive units 26,28 as illustrated in phantom in FIG. 1 by operator release of the joystick handle, or may be moved to position overlying drive units 26a,28a by continued holding of the joystick handle in the IN position. When cargo unit 24 moves to a position overlying drive unit 26a, presence of the cargo unit is detected by the drive unit ULD sensor, and drive unit 26a is automatically activated by LPC/controller 32 to continue lateral movement of the cargo unit. In the meantime, when the cargo unit no longer overlies drive unit 26, absence of the cargo unit is sensed by ULD sensor 84, and drive unit 26 is de-activated—i.e., returned to its retracted position by de-energizing the motor while not energizing the brake.

With cargo unit 24 overlying drive units 26,28 (or 26a, 28a), the cargo unit may be moved to and through stowing bays 16,18,20 by operator placement of joystick handle in the FWD position. In this second mode of operation, drive unit 26 is automatically retracted by LPC/controller 32, and drive unit 28 is automatically activated by applying electrical power to motor 42 in the forward direction so as first to lift or erect the drive unit through its associated differential 46, and then to power roller 72 in the forward longitudinal direction. In this way, cargo unit 24 is moved in the longitudinal forward direction toward spring-loaded power drive unit 30 in stowing bay 16. As the cargo unit approaches drive unit 30, controller 32 activates drive unit 30 so as to convey cargo unit 24 in a forward and uninterrupted motion. When cargo unit 24 leaves loading bay 14, which is to say that the cargo unit no longer overlies power drive unit 28, ULD sensor 84 of drive unit 28 provides a corresponding signal to LPC/controller 32, which then deactivates drive unit 28. In the meantime, drive unit 30 in bay 16 continues to convey the cargo unit in the forward direction as long as joystick 34 is held in the FWD position. aS the cargo unit approaches drive unit 30 in bay 18, drive unit 30 is automatically activated by controller 32 to continue the smooth uninterrupted motion of the cargo unit. Forward motion is arrested when joystick handle 36 is returned to the center position.

Unloading of cargo from aircraft 12 proceeds in a manner essentially opposite to that hereinabove described. That is, the operator first moves joystick handle 36 to the AFT position, whereupon LPC/controller 32 activates the spring-loaded power drive unit in stowing bay 16,18 or 20 (whichever is closest to door 22 and has a cargo unit overlying the same). The cargo unit is conveyed in a smooth and uninterrupted motion in the AFT direction, with the spring-loaded power drive unit being deactivated by controller 32 as soon as the cargo unit has been transferred to the next stowing unit, which is to say that the cargo unit is no longer detected by the drive unit sensor 84. When cargo unit 24 reaches the position illustrated in phantom in FIG. 1, the operator moves joystick handle 36 from the AFT position to the OUT position, whereupon drive unit 28 is deactivated and drive unit 26 is activated to move the cargo unit laterally out of loading bay door 22.

Orthogonally oriented drive units 26,28 (and 26a,28a) cooperate with each other and with LPC/controller 32 in a third mode of operation to lock cargo unit 24 in position in the loading bay when neither lateral nor longitudinal motion has been commanded by the operator. That is, both drive units are lifted (if necessary) and maintained in the lifted or erected position while the drive motors are turned off or de-energized because no cargo unit motion is desired by the operator. Where the drive unit has already been erected, this is accomplished by activating brake 82 (FIGS. 2B and 3) while deactivating motor 42. Thus, roller 72 remains in frictional contact with the overlying cargo unit 24 while no motion is imparted to the roller from the drive motor. The other drive unit is simultaneously erected by LPC/controller 32 by activation of motor 40, at which point motor 42 is deactivated while the associated brake 82 is energized. Thus, both of the orthogonally oriented drive units 26,28 (or 26a,28a) are erected, but the respective drive rollers are not energized. Orthogonal orientation of the drive rollers prevents motion of the cargo unit. That is, the drive roller of drive unit 26, which would permit cargo unit motion in the lateral direction acts as a friction brake on the under surface of the cargo unit to prevent motion in the longitudinal direction. In the same way, the drive roller of drive unit 28, which permits cargo unit motion in the longitudinal direction, acts as a friction brake on the underside of the cargo unit to prevent motion in the lateral direction. The cargo unit is thus held in position by drive units 26,28 so as to prevent inadvertent motion either longitudinally or laterally out of loading bay door 22.

We claim:

1. A method of loading cargo as cargo units in an aircraft cargo handling system having a cargo loading bay that opens laterally of the aircraft and at least one cargo stowing bay adjacent to said cargo loading bay longitudinally of the aircraft, said method comprising the steps of:

(a) providing in said cargo loading bay at least two orthogonally oriented self-erecting power drive units, each having a drive roller coupled to an electric motor for driving a cargo unit either longitudinally or laterally and means for selectively erecting said power drive unit from a retracted position to an erected position for engagement with a cargo unit overlying said drive unit, (b) selectively activating one of said power drive units in a first mode of operation for loading or unloading cargo to or from the cargo loading by erecting said one unit and energizing said roller of said one unit to propel a cargo unit in engagement with such roller laterally into or out of the loading bay, (c) selectively activating the other of said power drive units in a second mode of operation for moving cargo between the cargo loading bay and the cargo stowing bay by erecting said other unit and energizing said roller of said other unit to propel a cargo unit in engagement with such roller longitudinally into or out of the loading bay, and (d) in a third mode of operation, erecting both of said power drive units so as to lock in position a cargo unit engaged by both of said drive rollers due to said orthogonal orientation of said drive rollers.

2. The method set forth in claim 1 wherein said means for selectively erecting said power drive units provided in said step (a) comprises means coupled to said motors such that energization of said motors in said steps (b) and (c) both erect and drive the rollers of the associated units.

3. The method set forth in claim 2 wherein said power drive units provided in said step (a) each further include brake means for maintaining said units in erect position, and wherein said step (d) comprises the step of energizing said brake means in both of said power drive units while de-energizing said motors in both of said units.

4. The method set forth in claim 3 comprising the additional steps of:
   (e) entering into said first and second modes of operation responsive to selection by an operator, and
   (f) entering into said third mode of operation automatically when neither of said first and second modes of operation has been selected in said step (e).

5. The method set forth in claim 4 comprising the additional steps of:
   (g) sensing at each of said power drive units when a cargo unit overlies such power drive unit, and
   (h) entering into said first, second and third modes of operation at each of said power drive units individually only when a said cargo unit overlies said drive unit.

6. The method set forth in claim 1 comprising the additional steps of:
   (e) sensing at each of said power drive units when a cargo unit overlies such power drive unit, and
   (f) entering into said first, second and third modes of operation at each of said power drive units individually only when a said cargo unit overlies said drive unit.

7. The method set forth in claim 1 comprising the additional steps of:
   (g) providing in said at least one cargo stowing bay a third power drive unit having a drive roller coupled to an electric motor for driving a cargo unit longitudinally from and to the cargo loading bay and means for sensing when a cargo unit overlies said third power drive unit, and
   (h) in said second mode of operation, energizing said motor in said third power drive unit.

8. A method of handling cargo as cargo units in an aircraft cargo handling system comprising the steps of:
   (a) providing a power drive unit having a power drive roller for engagement with a cargo unit that overlies said power drive unit, an electric motor responsive to application of electrical power for driving said drive roller, and means for sensing when a cargo unit overlies said power drive unit,
   (b) applying electrical power to said motor to drive said roller and propel a cargo unit along said system,
   (c) terminating application of electrical power to said motor in said step (b) when said sensing means senses that a cargo unit no longer overlies said power drive unit,
   (d) providing at said power drive unit means coupled to said electric motor for selectively erecting said unit from a retracted position to an erected position for engagement with a cargo unit overlying said drive unit such that application of electrical power to said motor in said step (b) both erects the power drive unit and drives the roller in said unit,
   (e) activating said erecting means to bring said drive roller into position for engagement with a cargo unit,
   (f) de-activating said erecting means in said step (e) when said sensing means senses that a cargo unit no longer overlies said power drive unit,
   (g) providing brake means at said power drive unit coupled to said erecting means for selectively maintaining said erected position at said power drive unit independent of said motor,
   (h) activating said brake means responsive to said sensing means to maintain said erected position of said power drive unit when electrical power is removed from said motor and a cargo unit overlies said power drive unit, and
   (i) de-activating said brake means in said step (h) responsive to said sensing means when said sensing means senses that a cargo unit no longer overlies said power drive unit.

9. The method set forth in claim 8 wherein said step (a) comprises the step of providing a plurality of said power drive units in a series for sequentially engaging and moving a cargo unit,
   wherein said step (b) comprises the step of applying electrical power to said motor of each said drive unit in sequence as a cargo unit approaches each said unit, and
   wherein said step (c) comprises the step of terminating application of electrical power to said motor in each said unit when the cargo unit no longer overlies such unit.

10. A system for handling cargo units in an aircraft having a cargo loading bay that opens laterally of the aircraft and at least one cargo stowing bay adjacent to said cargo loading bay longitudinally of the aircraft, said system comprising:
    a plurality of power drive units for disposition in the cargo loading bay, each of said power drive units including a power drive roller for engagement with a cargo unit overlying the power drive unit, a motor coupled to said roller and responsive to electrical power for driving said roller, and means for selectively erecting said power drive unit from a retracted position in which said roller is spaced from a overlying cargo unit to an erected position in which said drive roller is disposed for engagement with an overlying cargo unit,
    said plurality of power drive units including a first power drive unit for disposition such that the associated roller is oriented to propel cargo units laterally of the aircraft and a second power drive unit for disposition such that the associated roller is oriented to propel cargo units longitudinally of the aircraft, said power drive units being for disposition adjacent to each other such that both may selectively simultaneously engage a single cargo unit, and
    control means for selectively energizing said motors and said erecting means in said first and second power drive units, including means for selectively energizing said erecting means in both of said units simultaneously such that orthogonal orientation of said drive rollers in said first and second power drive units effectively prevent movement of an overlying cargo unit engaged by both said rollers.

11. The system set forth in claim 10 wherein said erecting means in each of said first and second power drive units comprises a power-splitting differential having an input coupled to said motor, a first output for erecting said power drive unit and a second output coupled to said roller, and brake means coupled to said first output for maintaining erected position of said power drive unit after said motor is de-energized, and
    wherein said control means includes means for selectively activating said brake means independent of said motor in each said power drive unit.

12. The system set forth in claim 10 wherein each said motor is a bidirectional motor, and wherein said control means includes means for selectively controlling direction of each said motor for selectively loading and unloading cargo units to and from the cargo loading bay under control of said first power drive unit and for selectively conveying cargo units to and from the cargo stowing bay under control of said second power drive unit.

13. The system set forth in claim 12 further comprising a third power drive unit for disposition in the cargo stowing bay, and wherein said control means includes means for operating said third power drive unit in coordination with said second power drive unit for conveying cargo units between the cargo loading bay and the cargo stowing bay.

14. The system set forth in claim 13 wherein each of said power drive units further includes means for sensing presence of a cargo unit overlying the power drive unit, said control means further including means responsive to all of said sensing means for selectively energizing all of said motors and all of said erecting means.

15. The system set forth in claim 10 wherein each of said power drive units further includes means for sensing presence of a cargo unit overlying the power drive unit, said control means further including means responsive to all of said sensing means for selectively energizing all of said motors and all of said erecting means.

16. The system set forth in claim 15 wherein each said sensing means comprises a photo-optical sensor.

17. The system set forth in claim 16 wherein said photo-optical sensor comprises a light source and a light sensor carried by an associated power drive unit for detecting presence of a cargo unit overlying the associated power drive unit as a function of light energy from said light source reflected by the cargo unit onto said light sensor.

* * * * *